United States Patent
Hashimoto

(10) Patent No.: US 9,996,482 B2
(45) Date of Patent: Jun. 12, 2018

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Yasuhiko Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1416 days.

(21) Appl. No.: 13/898,953

(22) Filed: May 21, 2013

(65) Prior Publication Data

US 2013/0326012 A1 Dec. 5, 2013

(30) Foreign Application Priority Data

Jun. 1, 2012 (JP) .................................. 2012-126541

(51) Int. Cl.
*G06F 13/10* (2006.01)

(52) U.S. Cl.
CPC .................................... *G06F 13/10* (2013.01)

(58) Field of Classification Search
CPC ............. H04N 21/8173; H04N 5/4403; H04N 21/42204; H04N 21/485; H04N 21/422; H04N 1/00244; H04L 29/06; H04L 51/08; G06F 3/1288; G06F 3/1204; G06F 9/4411; G06F 1/1632
USPC ........................................................ 709/217
See application file for complete search history.

(56) References Cited

U.S. PATENT DOCUMENTS

| | | | |
|---|---|---|---|
| 5,740,028 A | 4/1998 | Sugiyama et al. | 364/130 |
| 5,859,956 A | 1/1999 | Sugiyama et al. | 395/112 |
| 5,867,563 A | 2/1999 | Kato et al. | 379/88.01 |
| 5,956,487 A * | 9/1999 | Venkatraman | H04L 12/2803 340/3.1 |
| 5,996,029 A | 11/1999 | Sugiyama et al. | 710/15 |
| 6,177,934 B1 | 1/2001 | Sugiura et al. | 345/335 |
| 6,321,266 B1 | 11/2001 | Yokomizo et al. | 709/226 |
| 6,529,936 B1 * | 3/2003 | Mayo | G06F 17/3089 707/E17.116 |
| 6,804,016 B2 | 10/2004 | Hashimoto et al. | 358/1.13 |
| 9,537,968 B1 * | 1/2017 | Kirkby | H04L 67/125 |
| 2002/0178295 A1 * | 11/2002 | Buczek | H04L 41/5054 709/250 |

(Continued)

FOREIGN PATENT DOCUMENTS

| | | |
|---|---|---|
| JP | H11-017964 | 1/1999 |
| JP | 2006-039982 A | 2/2006 |

(Continued)

OTHER PUBLICATIONS

Counterpart office action, Japanese Application No. 2012-126541, dated Sep. 2, 2016.

(Continued)

*Primary Examiner* — Douglas Blair
(74) *Attorney, Agent, or Firm* — Fitzpatrick, Cella, Harper & Scinto

(57) ABSTRACT

When an instruction to access a web server of an external device connected via a local interface is acquired from a user, access destination information for accessing the web server via the local interface is acquired. Based on the acquired access destination information, communication is performed with the web server of the external device via the local interface.

16 Claims, 7 Drawing Sheets

(56) References Cited

U.S. PATENT DOCUMENTS

| | | | | |
|---|---|---|---|---|
| 2005/0021603 | A1* | 1/2005 | Yokomitsu | H04L 29/12047 709/203 |
| 2006/0026317 | A1* | 2/2006 | Niikura | G06F 13/102 710/62 |
| 2007/0046972 | A1* | 3/2007 | Hirai | G06F 3/1204 358/1.13 |
| 2007/0079254 | A1* | 4/2007 | Kwak | G06F 17/30106 715/803 |
| 2007/0109561 | A1* | 5/2007 | Suzue | H04N 1/00408 358/1.1 |
| 2007/0124796 | A1* | 5/2007 | Wittkotter | H04N 7/17309 725/136 |
| 2008/0104575 | A1* | 5/2008 | Fan | G06F 11/36 717/124 |
| 2008/0126653 | A1* | 5/2008 | King | H04L 67/02 710/300 |
| 2009/0094539 | A1* | 4/2009 | Wang | G06F 9/4446 715/762 |
| 2011/0019222 | A1* | 1/2011 | Tang | G06F 11/3013 358/1.14 |
| 2011/0125910 | A1* | 5/2011 | Sueda | H04M 7/003 709/227 |

FOREIGN PATENT DOCUMENTS

| | | |
|---|---|---|
| JP | 2007-156614 | 6/2007 |
| JP | 2009-070391 | 4/2009 |

OTHER PUBLICATIONS

JP Office Action—JP Application No. 2012-126541, dated Apr. 1, 2016.

* cited by examiner

INFORMATION PROCESSING APPARATUS, INFORMATION PROCESSING METHOD AND STORAGE MEDIUM

BACKGROUND OF THE INVENTION

Field of the Invention

The present invention relates to an information processing apparatus that accesses a web server, an information processing method, and a storage medium that stores a program.

Description of the Related Art

Conventionally, there are known to be peripheral devices such as printers that can be operated due to including a web server function in the peripheral device, and accessing the web server from a host PC using a web browser via a network. In this way, it is possible to operate a peripheral device with a host PC using a general-purpose web browser.

However, when connecting a peripheral device to a host PC via a local interface such as a USB communication interface, the peripheral device cannot be operated using the web browser since the web browser of the host PC does not support access by local interface. In view of this, it is known that with the conversion of data formats and the like between a web browser and a local interface, it is possible to use a web browser even through a local interface (Japanese Patent Laid-Open No. 2006-39982).

In Japanese Patent Laid-Open No. 2006-39982, a network channel such as an IP address and a port for a local interface is generated and a web browser accesses a peripheral device using that network channel.

However, in Japanese Patent Laid-Open No. 2006-39982, when a peripheral device is connected to a local interface, a network channel for the local interface is generated automatically, and a peripheral device is accessed. Alternatively, this network channel is generated with a manual operation by a user.

When the network channel is generated automatically when a peripheral device is connected to a local interface, access via the local interface is performed against the user's intent. On the other hand, when the network channel is generated according to the user's manual operation, a variety of parameters need to be set once the user knows how to designate a target peripheral device and how to generate a network channel.

SUMMARY OF THE INVENTION

An aspect of the present invention is to eliminate the above-mentioned problems with the conventional technology. The present invention provides an information processing apparatus, an information processing method, and a storage medium storing a program that improve the convenience to the user when accessing a web server via a local interface.

The present invention in its one aspect provides an information processing apparatus that can communicate with an external device via a local interface, comprising: a reception unit configured to receive an instruction to access a web server of the external device connected via the local interface; an acquisition unit configured to, if the access instruction is received by the reception unit, acquire access destination information for accessing the external device via the local interface; and a communication control unit configured to, based on the access destination information acquired by the acquisition unit, communicate with the web server of the external device via the local interface.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements will be denoted by the same reference signs, and redundant descriptions thereof will be omitted.

Embodiment 1

Figure 1:
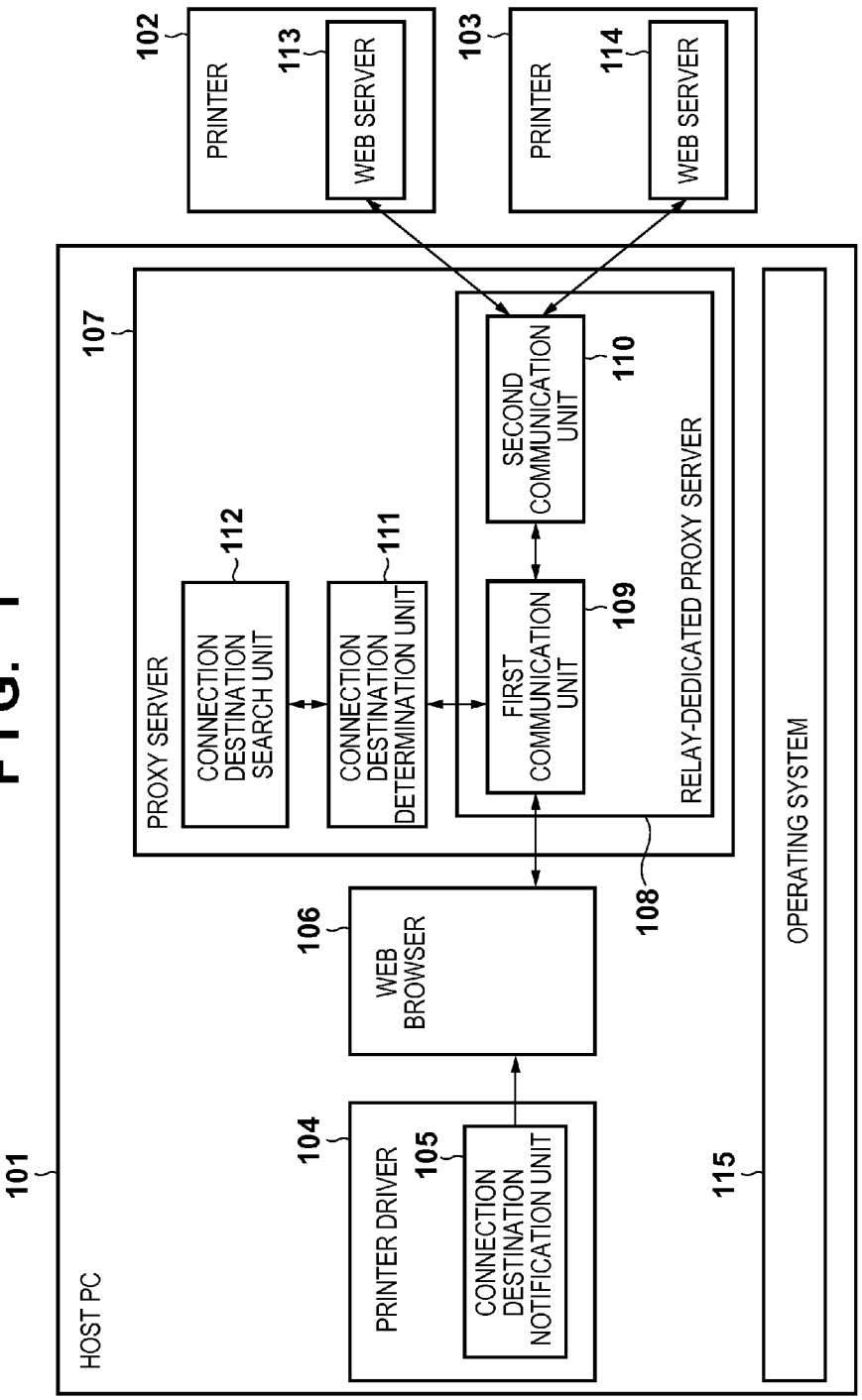
FIG. 1 is a diagram showing a configuration of a web server system.

FIG. 1 is a diagram showing a configuration of a web server system that includes an information processing apparatus of the present embodiment. A host PC 101 serving as an information processing apparatus is a general-purpose computer including the constituent elements and functions described below. The host PC 101 includes an operating system (OS) 115, a device driver (printer driver 104) that corresponds to printers (examples of peripheral devices), and a proxy server 107. The printer driver 104 is registered in the OS 115. The OS 115 creates a printer queue that manages jobs with respect to a printer 102 and a printer 103, which are connected to the host PC 101. The printer driver 104 for the corresponding printers is associated with the created printer queue. The OS 115 also manages connection destination port information of the printer 102 and the printer 103 with respect to the printer queue in addition to the printer driver 104. Connection destination port information is, for example, port information that corresponds to a local connection interface or a network connection interface. In the case of a local connection interface, it is the name of a USB port for example, and in the case of a network connection interface, it is an IP address for example. Additionally, when the printer driver 104 is installed for example, the connection configuration with the printer is checked, and the connection destination port information is allocated by the OS 115 as a port for use in printing.

The printer driver 104 is software that includes a settings screen for various types of settings for causing the corresponding printer to carry out printing, a function for converting print target data into a format that is interpretable by printers, and the like. The printer driver 104 includes a connection destination notification unit 105. The connection destination notification unit 105 operates when the user instructs the execution of the function "access printer web server via USB" in the printer driver 104. The operation of the connection destination notification unit 105 will be described later with reference to FIG. 3. A web browser 106 is a general-purpose web browser, and is started by a direct instruction from the user, as well as by an instruction via the connection destination notification unit 105 of the printer driver 104.

The proxy server 107 is installed at the same time as the printer driver 104 is installed. The proxy server 107 is software that includes a function that connects to the printer 102 or the printer 103, based on access from the web browser 106. The proxy server 107 is arranged on the relay path that the web browser 106 has with a web server 113 in the printer 102, and a web server 114 in the printer 103. According to this configuration, the proxy server 107 mediates communication that the web browser 106 performs with both the web server 113 and the web server 114. The web server 113 is a web server built into the printer 102. The web server 114 is a web server built into the printer 103.

The proxy server 107 includes a relay-dedicated proxy server 108, and the relay-dedicated proxy server 108 includes a first communication unit 109 and a second communication unit 110. The first communication unit 109 communicates with the web browser 106 using the HTTP protocol in the TCP/IP protocol. When the printer 102 and the printer 103 are connected with a host PC via a USB interface, the second communication unit 110 communicates with the printers using the HTTP protocol in the USB IEEE 1284.4 protocol. The printer 102 and the printer 103 communicate with the proxy server 107 using the HTTP protocol in the USB protocol IEEE 1284.4. The IEEE 1284.4 protocol is a protocol for performing multichannel bi-directional communication and corresponds to an OSI (Open System Interconnection) model transport layer. A channel for HTTP protocol communication operates as one channel in the IEEE 1284.4 protocol. As another channel in the IEEE 1284.4 protocol, there is, for example, a print job channel for transmitting printing jobs to the printer 102 and the printer 103. Additionally, as another channel, there is a management channel for acquiring status, product name, supported functions, and the like for the printer 102 and the printer 103. The management channel is used for printer searching, which will be described later with reference to FIG. 6.

The proxy server 107 includes a connection destination search unit 112 and a connection destination determination unit 111. The connection destination determination unit 111 determines to which printer the proxy server 107 will connect based on information sent by the connection destination notification unit 105 of the printer driver 104 to the web browser 106. The operation of the connection destination determination unit 111 will be described later with reference to FIG. 4. The connection destination search unit 112 searches for a printer to which the proxy server 107 will connect, regardless of the information sent from the connection destination notification unit 105 of the printer driver 104. The operation of the connection destination search unit 112 will be described later with reference to FIG. 6. Additionally, the proxy server 107 operates in the background, and to the user, it appears that only the web server 106 is operating.

Figure 2:
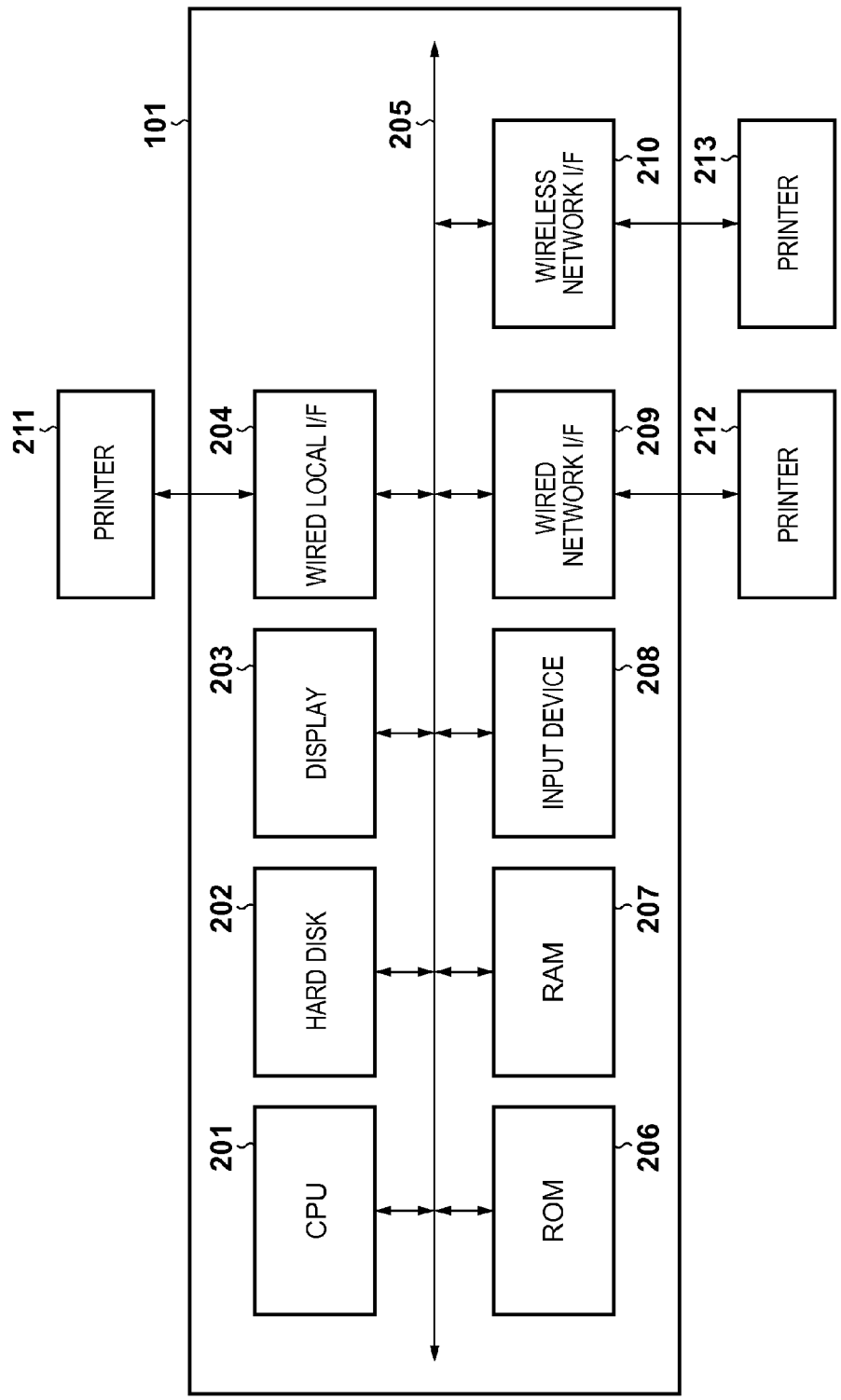
FIG. 2 is a diagram showing a hardware configuration of a host PC 101.

FIG. 2 is a diagram showing a hardware configuration of the host PC 101. A CPU 201 performs overall control of units of the host PC 101. A hard disk 202 stores software such as the OS 115, the printer driver 104, the web browser 106, and the proxy server 107 of FIG. 1. The CPU 201 performs the processes shown below by executing these pieces of software (programs). A display 203 displays a user interface screen and the like. A wired local interface (I/F) 204 is an interface for connecting to an external device via a USB or an IEEE 1394 for example, and connects to a printer 211. The printer 211 is, for example, the printer 102 or the printer 103 shown in FIG. 1. A wired network interface (I/F) 209 is an interface for connection via Ethernet (registered trademark) for example, and connects to a printer 212. A wireless network I/F 210 is an interface for connection via a wireless LAN for example, and connects to a printer 213. In the present embodiment, access to a built-in web server of a printer connected via the USB interface will be described, but this embodiment is also applicable with regards to accessing a built-in web server of the printer 212 or the printer 213.

A ROM 206 stores a basic program for starting the OS 115. A RAM 207 is a work storage area that is used by the CPU 201 when realizing the present embodiment. An input device 208 is a keyboard or a pointing device or the like, and various instructions from a user of the host PC 101 can be acquired via the input device 208. A system bus 205 is connected to the above-mentioned units to enable communication between them.

Figure 3:
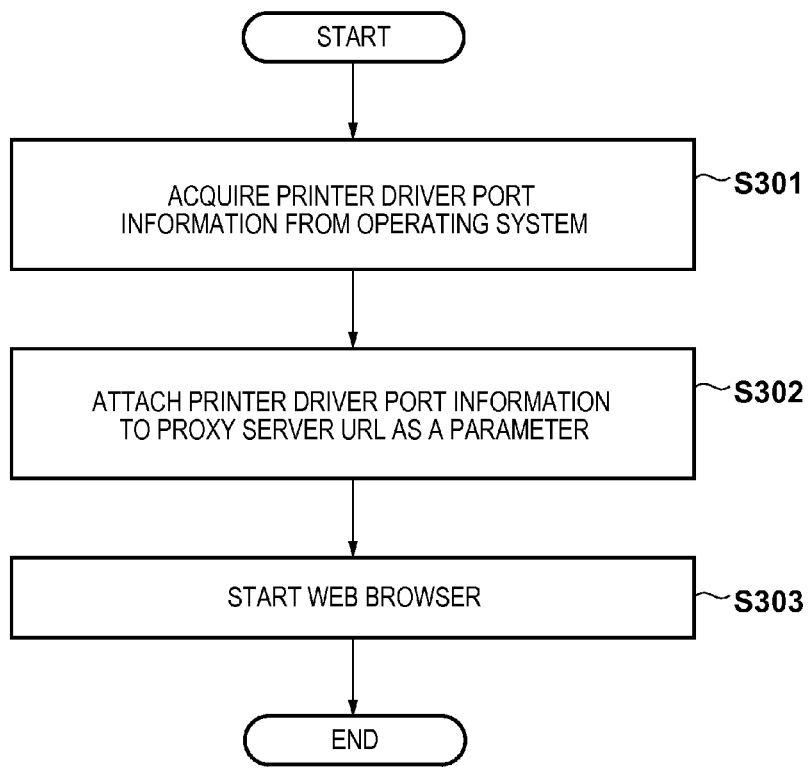
FIG. 3 is a diagram showing a procedure of startup processing of a web browser.

Below, communication control processing in the host PC of this embodiment will be described with reference to FIGS. 3, 4, 5, and 6. FIG. 3 is a flowchart showing a procedure of startup processing of the web browser 106. The processing shown in FIG. 3 is executed by the CPU 201 of the host PC 101 for example. First, the user of the host PC 101 instructs the execution of a function "access connected printer via USB using web browser" on a user interface screen of the printer driver 104. Upon doing so, the connection destination notification unit 105 of the printer driver 104 is started. In step S301, the CPU 201 acquires connection destination port information of the printer driver 104 managed by the OS 115. In step S302, the connection destination port information acquired in step S301 is attached as a parameter to the URL of the proxy server 107, and thus the CPU 201 generates a URL for printer access. The connection destination port information is attached so as to generate "http://localhost:8081/index.html?usb_port_name=USB001" for example. This example is a case where the port allocated to the printer driver 104 is "USB001". In step S303, the CPU 201 sends, as an access URL when the web browser 106 starts, the character string of the URL with the connection destination port information of the printer driver 104 that was attached in step S302, and starts the web browser 106. Subsequently, the present processing ends. The web browser 106 responds to the startup instruction, and, in accordance with the above-mentioned designated URL, accesses the proxy server 107 with the TCP/IP HTTP protocol. Note that if a printer that corresponds to the printer driver 104 is connected to the PC 101 via a network, the URL generated to access the printer is a URL that includes the IP address of the printer (a web server IP address).

Figure 4:
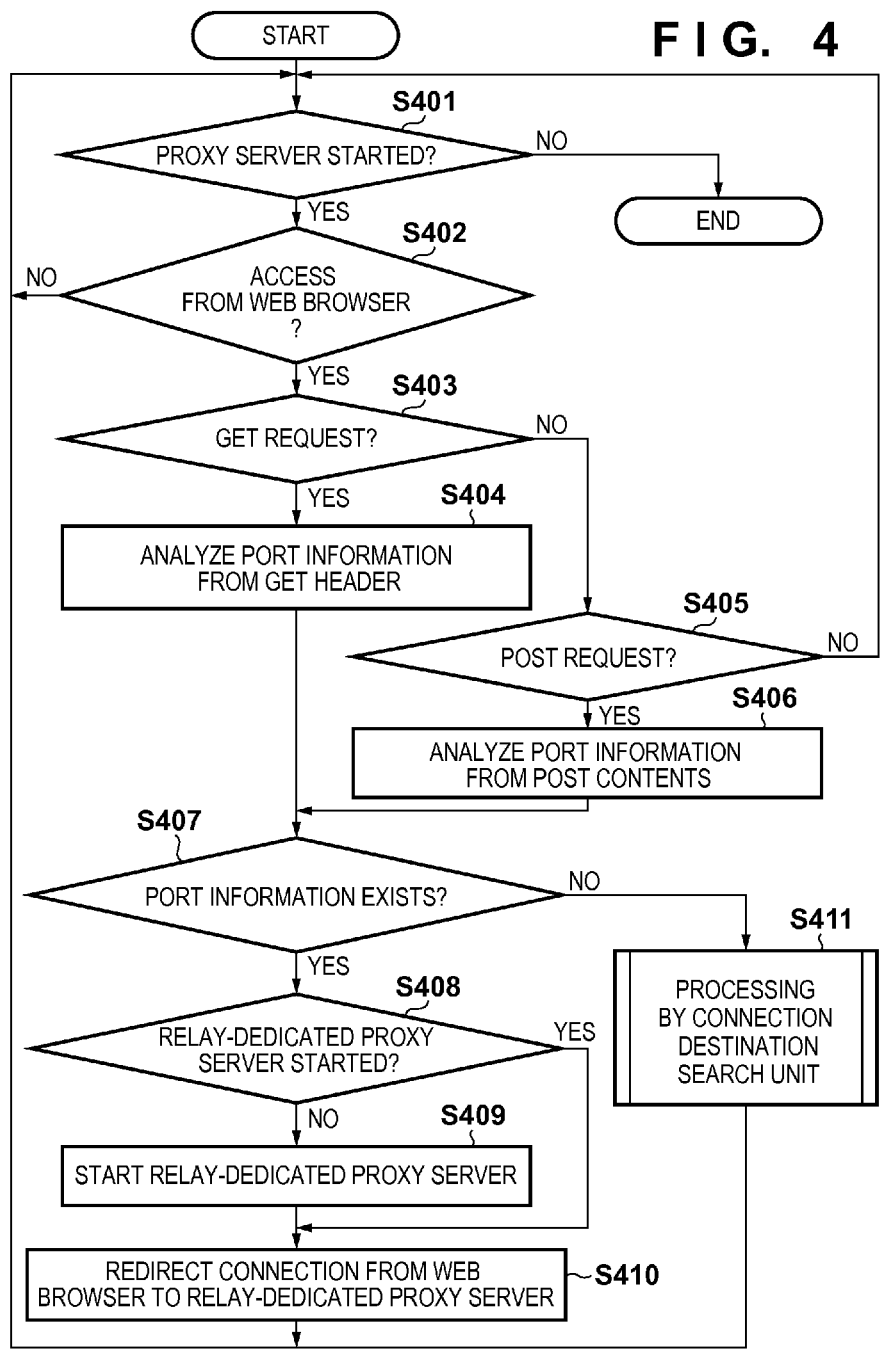
FIG. 4 is a diagram showing a processing procedure performed by a connection destination determination unit of a proxy server.

FIG. 4 is a flowchart showing a procedure of processing performed by the connection destination determination unit 111 of the proxy server 107. The proxy server 107 is started at the same time as the startup of the OS 115 for example. In step S401, the CPU 201 determines whether or not the proxy server 107 has started. Here, if it is determined that the proxy server 107 has not started, the present processing ends. The connection destination determination unit 111 of the proxy server 107 begins operation at the same time as the startup of proxy server 107. In step S402, the CPU 201 determines whether or not there is access from the web browser 106. Here, if it has been determined that there is no access from the web browser 106, the processing is repeated from step S401. On the other hand, if it is determined that there is access from the web browser 106, the processing continues to step S403. In step S403, the CPU 201 determines whether or not the access from the web browser 106 is an HTTP protocol GET request. Here, if it is determined that it is an HTTP protocol GET request, the CPU 201 analyzes the GET request data in step S404. The contents of the URL character string, with the connection destination port data attached in step S302, are described in the GET request (GET header) in accordance with the HTTP protocol, e.g., "GET/index.html?usb_port_name=USB001HTTP/ 1.1". "usb_port_name=USB001" indicates the USB connection destination port information. In step S404, this connection destination port information is acquired according to the analysis described above.

On the other hand, if it is determined in step S403 that it is not an HTTP protocol GET request, in step S405, the CPU 201 determines whether or not the access from the web browser 106 is an HTTP protocol POST request. Here, if it is determined that it is an HTTP protocol POST request, in step S406, the POST request (POST content) data is analyzed, and the connection destination port information is acquired. On the other hand, if it is determined that it is not an HTTP protocol POST request, the processing is repeated from step S401.

In step S407, the CPU 201 determines, as a result of the analysis carried out in step S404 or step S406, whether or not the connection destination port information exists. Here, if it is determined that the connection destination port information exists, the processing continues to step S408. On the other hand, if it is determined that the connection destination port information does not exist, the processing continues to step S411. The processing of step S411 will be described later with reference to FIG. 6. After the processing of step S411, the processing is repeated from step S401.

In step S408, the CPU 201 determines whether or not the relay-dedicated proxy server 108, which connects to the connection destination port information acquired in step S404 or step S406, has started. If it is determined that the relay-dedicated proxy server 108 has started, the processing continues to step S410. On the other hand, if it is determined that the relay-dedicated proxy server 108 has not started, in step S409, the CPU 201 starts the relay-dedicated proxy server 108 and the processing continues to step S410. The connection destination port information acquired in step S404 or step S406 is, for example, the port name of the printer 102 or the printer 103 such as "USB001," and is passed to the relay-dedicated proxy server 108 as a startup parameter. In step S410, the CPU 201 redirects, to the relay-dedicated proxy server 108, access from the web browser 106 to the proxy server 107. Additionally, at this time, the CPU 201 transmits an HTTP protocol status code from the first communication unit 109 to the web browser 106 as a reply. Included in the content of the reply is, for example, the content "HTTP/1.1 307 Temporary Redirect Location: http://localhost:8012/". Here, "http://localhost: 8012" is the URL of the relay-dedicated proxy server 108 that is connected to, for example, "USB001," which is a USB port. Here, in the case of connection to another USB port "USB002," another port number, such as "http://local-host:8013" may be designated. In view of this, the relay-dedicated proxy server 108 is provided with respect to each connection port, and the relay-dedicated proxy server 108 that corresponds to the designated port information is started. The subsequent operation of the relay-dedicated proxy server 108 will be described later with reference to FIG. 5.

Operation of Relay-Dedicated Proxy Server

Figure 5:
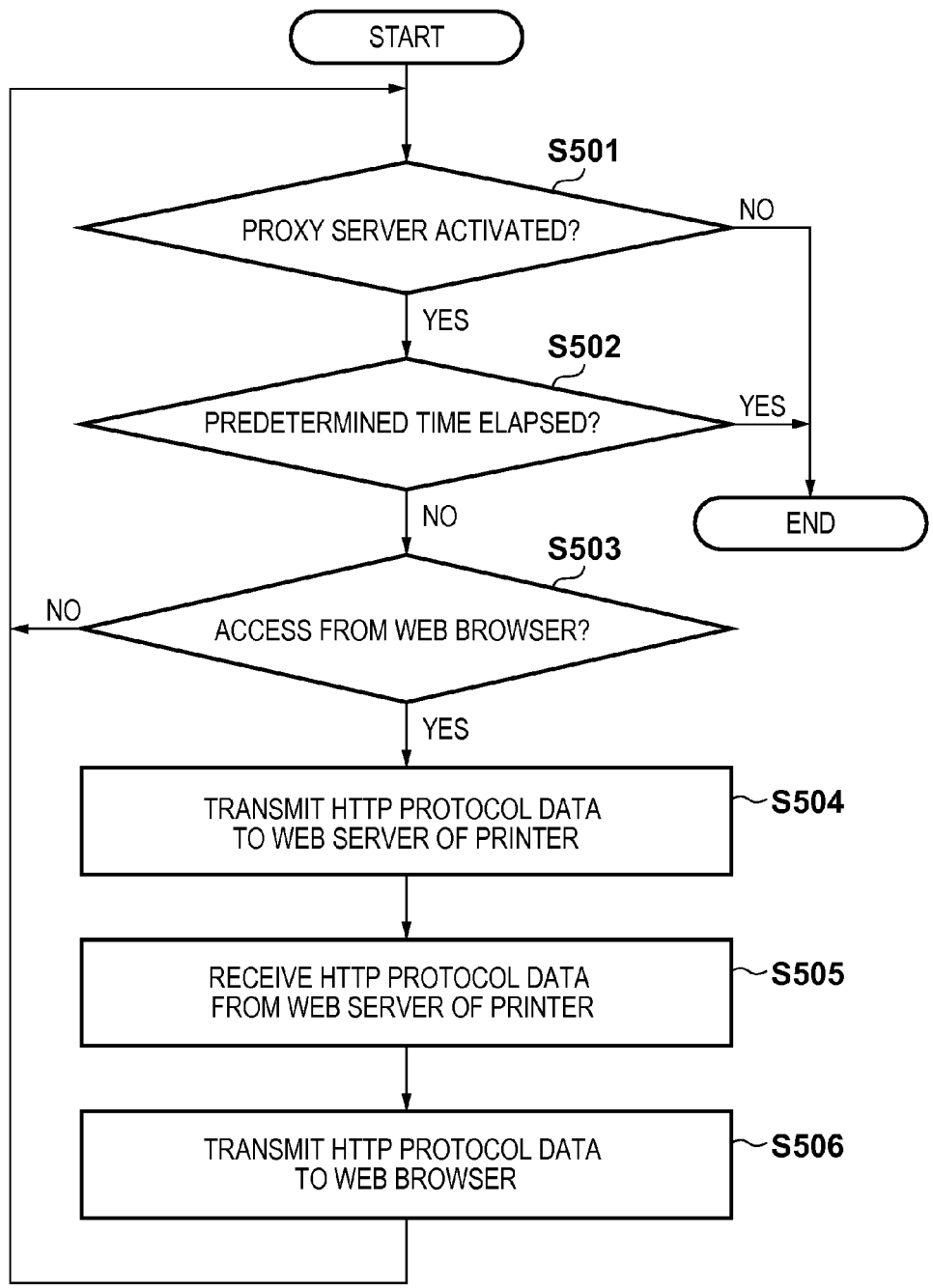
FIG. 5 is a diagram showing a procedure of operations performed by a relay-dedicated proxy server of Embodiment 1.

FIG. 5 is a flowchart showing an operation procedure of the relay-dedicated proxy server 108, which was started in step S409. The relay-dedicated proxy server 108 is designated as a redirect destination from the proxy server 107, and therefore, the web browser 106 accesses the relay-dedicated proxy server 108 that corresponds to a designated connection destination. In step S501, the CPU 201 determines whether or not the proxy server 107 has ended its operation. Here, if it is determined that the proxy server 107 has ended its operation, the present processing ends. In step S502, the CPU 201 determines whether or not a predetermined time has elapsed since the last time the proxy server 107 was accessed from the web browser 106. Here, that predetermined time is, for example, three minutes, and if there is no access from the web browser 106 in those three minutes, the present processing ends. In this way, according to the ending of the present processing after the elapse of a predetermined time, the relay-dedicated proxy server 108 is able to release to the OS 115 an area of the RAM 207 retained for the processing of the relay-dedicated proxy server 108. On the other hand, if it has been determined that the predetermined time has not elapsed, the processing continues to step S503.

In step S503, the CPU 201 determines whether or not there is access from the web browser 106 to the relay-dedicated proxy server 108. Here, if it is determined that there is no access from the web browser 106, the processing is repeated from step S501. On the other hand, if it is determined that there is access from the web browser 106, the processing continues to step S504. Additionally, in step S503, the CPU 201 acquires HTTP protocol data transmitted from the web browser 106 to the first communication unit 109. In step S504, the CPU 201, with the use of the second communication unit 110, transmits the HTTP protocol data acquired in step S503 to, for example, the web server 113 in the printer 102. The second communication unit 110 accesses the printer 211 that corresponds to the printer driver 104 over IEEE 1284.4 via USB using the acquired HTTP protocol data. According to this, the accessed printer 211 accesses, for example, the web server 113 with the use of an HTTP command, HTTP data, or the like acquired over IEEE 1284.4 via USB. The status of the printer 102 (paper information, existence of errors, and the like), print job status, print history, settings edit screen, and the like are provided by the web server 113 in the printer 102, and can be browsed, edited, and the like with the use of a web browser.

In the present embodiment, it can be said that the relay-dedicated server 108 is started in order to communicate with the web server 113 in the printer 102 in step S409. In step S505, the CPU 201, with the use of the second communication unit 110, receives HTTP protocol data as a response from the web server 113 of the printer 102. In step S506, the CPU 201 causes the HTTP protocol data received in step S505 over USB IEEE 1284.4 via USB to be sent from the first communication unit 109 to the web browser 106. The first communication unit 109 passes the received HTTP protocol data to the web browser 106 by TCP/IP.

According to the aforementioned operation of the relay-dedicated proxy server 108, the web browser 106 can communicate via USB with the web server 113 in the printer 102 and the web server 114 in the printer 103. At this time, access instructions are given using a printer driver, and therefore, an intended printer can be accessed easily. That is, because the access destination information for access using a web browser via that printer and a local I/F is set by the printer driver that corresponds to a specific printer, the user can access an intended printer via a local I/F that uses a web browser by instructing access using the printer driver that corresponds to the intended printer.

Operation of Connection Destination Search Unit of Proxy Server

Figure 6:
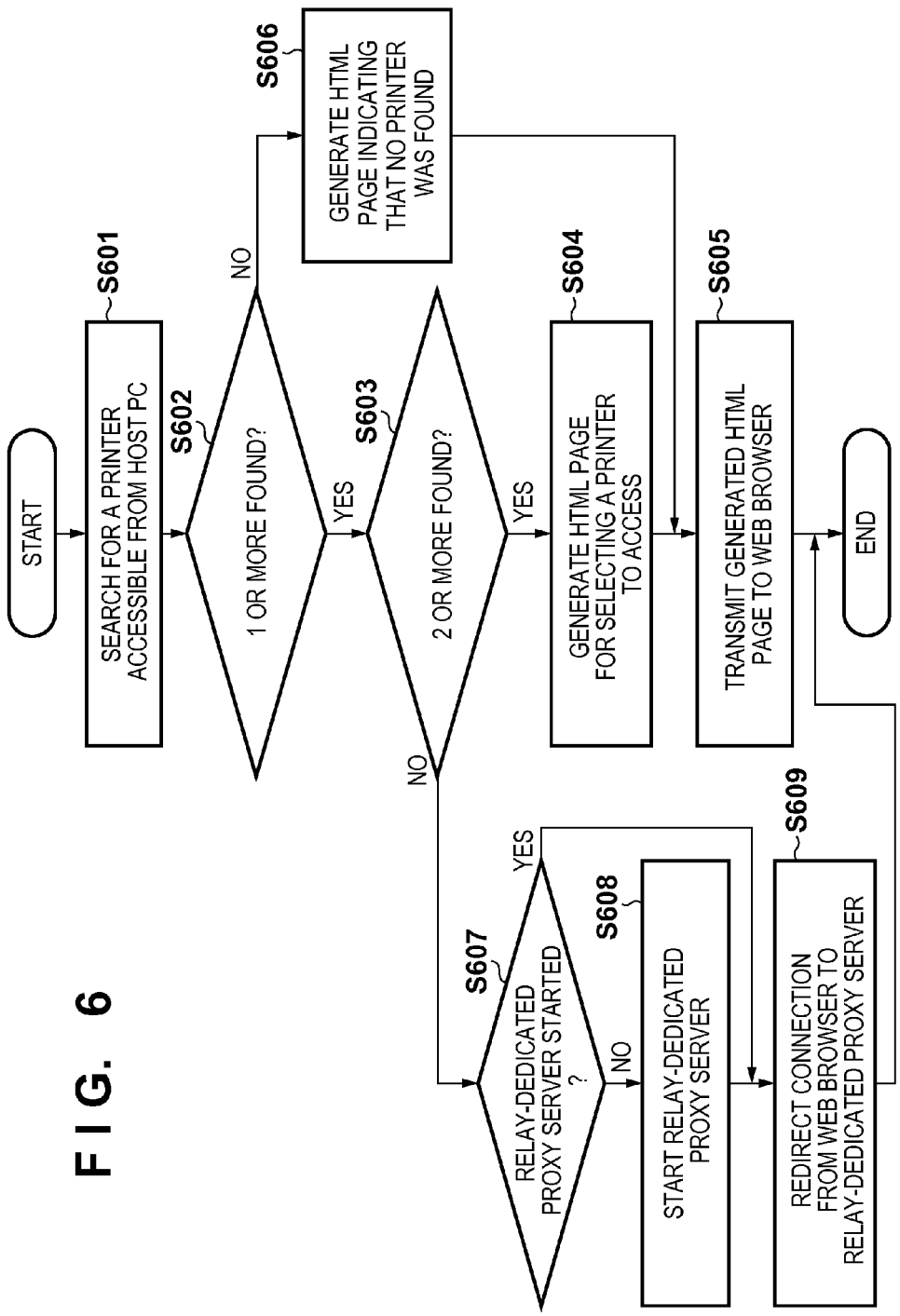
FIG. 6 is a diagram showing processing details of step S411 in FIG. 4.

FIG. 6 is a flowchart showing the processing details of the step S411. In step S407 of FIG. 4, if there is no connection destination port information which corresponds to printer driver 104 (or that information cannot be acquired), the flowchart shown in FIG. 6 is executed. In step S601, the CPU 201 searches for a printer that can be accessed by the host PC 101 in a network (via the wired network I/F 209, or the wireless network I/F 210). For example, the CPU 201 searches in a network for a printer connected in compliance with a Wireless USB standard. For example, the CPU 201 searches, using a management channel on an IEEE 1284.4 protocol, for products that support a web server built into a printer. As one example of the search method, first, a list of names of products that support web servers built into printers is held in the proxy server 107, and the names of printers on the network are acquired using a management channel. A method may be used in which an acquired product name is determined to be an accessible printer if the acquired product name is held in the product name list held by the proxy server 107 and if it is a printer that corresponds to printer 104.

Additionally, a different method may be used as a search method. For example, support information that indicates whether or not a web server built into a printer is supported may be acquired from the management channel. Here, as support information, a character string or value indicating "supported" or "not supported" may be the object of acquisition. For example, if the proxy server 107 acquires an ASCII character string such as "supported," it may be interpreted as "supported," and the corresponding printer may be determined to be an accessible printer. Additionally, if an ASCII character string such as "not_supported" is acquired, the corresponding printer may be interpreted as "not supported". Additionally, the USB ports of the PC 101 may be scanned in place of a search via a network.

In step S602, the CPU 201 determines whether or not one or more printers were found based on the search results from step S601. Here, if it is determined that no printers were found, in step S606, the CPU 201 generates an HTML page indicating that no printers were found. Then, in step S605, the CPU 201 transmits the HTML page generated in step S606 to the web browser 106 using the first communication unit 109. After step S605, this processing ends.

If it is determined that one or more printers were found in step S602, in step S603, the CPU 201 determines whether or not two or more were found. Here, if it is determined that two or more printers were found, in step S604, an HTML page is generated in which a user of the web browser 106 can choose a printer to access. For example, an HTML page as described below is generated.

```
<html>
<body>
<form method="post" action="/printer-selection.cgi">
<p>
<select name="printer-selection">
<option value="USB001">PRINTER_A:USB001</option>
<option value="USB002">PRINTER_B:USB002</option>
</p>
<p><input type="submit" value="send"></p>
</form>
</body>
</html>
```

Next, in step S605, the CPU 201 transmits the HTML page generated in step S604 to the web browser 106 using the first communication unit 109 and the present processing ends. A printer selection screen is displayed by the HTML page generated in step S604 when the HTML page is transmitted to the web browser 106, and therefore, a user of web browser 106 can select a printer to be accessed. When the user selects a printer, an HTTP protocol POST request is transmitted to the proxy server 107. Included in the HTTP protocol POST request is, for example, the information "POST /printer-selection.cgi HTTP/1.1". Additionally, "printer-selection=USB001" is included as content information of the POST request. Here, "printer-selection.cgi" is a program of the proxy server 107 that processes POST requests and performs the processing of step S406 in FIG. 4.

Due to an HTTP protocol POST request such as the one described above being transmitted to the proxy server 107, connection destination port information (USB port information), such as "USB001" is acquired in step S406.

If it is determined that two or more printers were not found, or, in other words, only one printer was found in step S603, the processing continues to step S607. In step S607, the CPU 201 determines whether or not the relay-dedicated proxy server 108, which operates with the port of the found printer, has started. Here, if it is determined that the relay-dedicated proxy server 108 has not been started, in step S608, the connection destination port information of the printer found in step S603 is sent as a startup parameter to the relay-dedicated proxy server 108, and the relay-dedicated proxy server 108 is started. On the other hand, if it is determined that the relay-dedicated proxy server 108, which operates with the port of the retrieved printer, has already started, the processing continues to step S609. In step S609, the CPU 201 redirects, to the relay-dedicated proxy server 108, access from the web browser 106 to the proxy server 107. After step S609, the present processing ends. The subsequent operation of the relay-dedicated server 108, which starts up according to step S609, is the same as the description in FIG. 5. Note that in a case where only one printer is found in step S603, this printer may be accessed if a user grants permission upon being asked to confirm whether or not that printer may be accessed.

Due to the operation of the connection destination determination unit 111 of the proxy server 107 as described above, a user of the web browser 106 can easily access the web server 113 in the printer 102 or the web server 114 in the printer 103 via the local I/F 204. Note that the processing shown in FIG. 6 may be executed in accordance with an instruction given by a user in place of being executed when a negative determination is made in step S407 of FIG. 4. In other words, it is possible to create a shortcut for specifying the URL of the proxy server 107, register the shortcut as a bookmark in the web browser 106, and designate it. Then, similarly to activating a normal web server, a user can access the web server 113 or the web server 114 just by designating the URL of the proxy server 107. At that time, the user does not need to perform a task to manually input the connection destination port information of the printer into the URL of the proxy server 107. It is possible to use a URL shortcut and URL bookmark that are registered by an installation program such as that for installing the program of the proxy server 107 to the OS 115 (not shown in FIG. 1). The URL of the proxy server 107 for registration is, for example, "http://localhost:8081/".

In the URL above, "localhost" is the host name of the IP address indicating the host PC 101 itself. Additionally, "8081" is the port number of the IP address and a port number for identifying a proxy server in host PC 101. The port number that identifies a proxy server may be another number as long as it is a port number that can be used by the host PC 101. A port number that can be used by the host PC 101 is, for example, one that was found as a port number usable in the host PC 101 by the above-mentioned install program. Alternatively, in a case in which the proxy server 107 has manual setting functions for port numbers, a port number may be set manually.

As described above, in the present embodiment, the host PC 101 in a web server system including a printer has the connection destination notification unit 105, the connection destination determination unit 111, and the connection destination search unit 112. In the present embodiment, the web browser 106 can easily access the web server 113 in the printer 102, or the web server 114 in the printer 103, both of which are associated with the printer driver 104.

Additionally, even in a case in which there is no connection destination port information associated with the printer driver 104, a user can select a desired printer from a list of accessible printers with the processing shown in FIG. 6. At that time, if there is one accessible printer, a user can access that printer without selecting. Additionally, as mentioned above, when accessing the desired printer, after information for accessing the printer is acquired as described above, a URL shortcut including that information may be generated, saved on the PC 101 (the OS 115), and registered as a web browser bookmark instead of using a printer driver each time. Accordingly, a user can easily access a web server in a printer just by accessing it from a URL shortcut on the operation screen of the OS 115, or a URL bookmark in the web browser 106. Note that in the above description, when a user designates the desired printer, the printer driver that corresponds to the desired printer is used, but there is no limitation to this. For example, an icon or an application may be used in place of a printer driver as an object for specifying a printer. In this case, as described above, information for accessing a printer is acquired according to the designation by the user of an object such as an icon or application.

Embodiment 2

In Embodiment 1, one relay-dedicated proxy server 108 is started for each connection destination, but in Embodiment 2, multiple printers can be connected according to one relay-dedicated proxy server 108. In the present embodiment, when the relay-dedicated proxy server 108 is started in step S409 in FIG. 4, the proxy server 107 sends back a response including the information below to the web browser 106.

HTTP/1.1 307 Temporary Redirect Location: http://localhost:8012/PORT¯USB001/

Here, "http://localhost:8013/PORT¯USB001/" is, for example, a URL showing the performing of access to "USB001".

Figure 7:
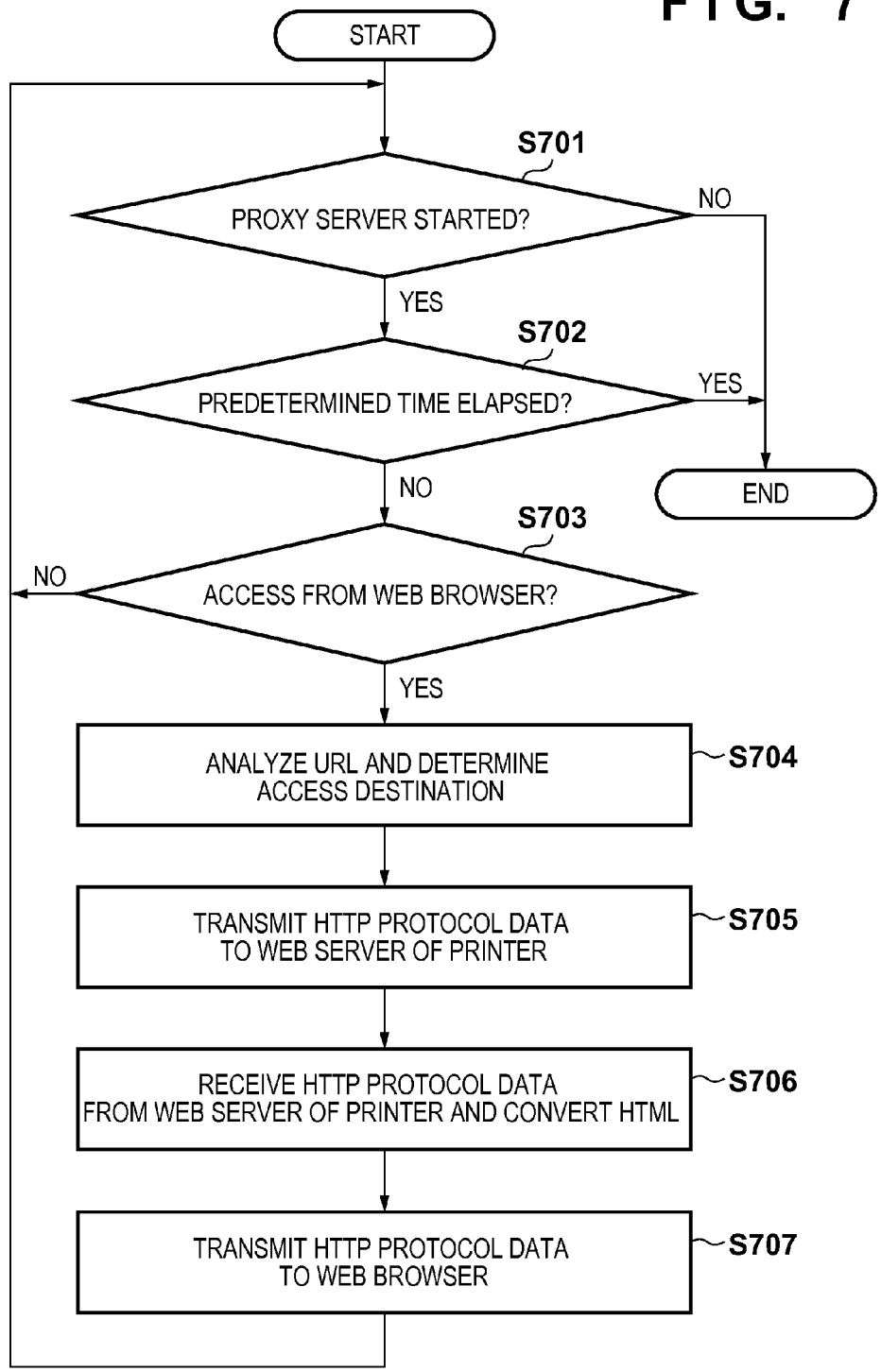
FIG. 7 is a diagram showing a procedure of operations performed by a relay-dedicated proxy server of Embodiment 2.

FIG. 7 is a flowchart showing an operation procedure of the relay-dedicated proxy server 108, which starts in step S409 in the present embodiment. The relay-dedicated proxy server 108 is designated as a redirect destination from the proxy server 107, and therefore, the web browser 106 can access the relay-dedicated proxy server 106. In step S701, the CPU 201 determines whether or not the proxy server 107 has ended its operation. Here, if it is determined that the proxy server 107 has not ended its operation, the present processing will end. In step S702, the CPU 201 determines whether or not a predetermined time has elapsed since the last time the proxy server 107 was accessed from the web browser 106. Here, the predetermined time is, for example, three minutes, and if there is no access from the web browser 106 in those three minutes, the present processing will end. In this way, due to the present processing ending after the elapse of a predetermined time, the relay-dedicated proxy server 108 is able to release the occupied memory to the OS 115. On the other hand, if it is determined that the predetermined time has not elapsed, the processing continues to step S703. In step S703, the CPU 201 determines whether or not there is access from the web browser 106. Here, if it is determined that there is no access from the web browser 106, the processing is repeated from step S701. On the other hand, if it is determined that there is access from the web browser 106, the processing continues to step S704.

In step S704, the CPU 201 acquires HTTP protocol data transmitted from the web browser 106 to the first communication unit 109 and analyzes the URL. As mentioned above, "PORT¯USB001" is included in the URL, and therefore, "USB001" is determined to be the access destination. For example, the web server that corresponds to the access destination "USB001" is the web server 113. Note that here, if the access destination included in the URL transmitted from the web browser 106 is "USB002," the access destination will be determined to be "USB002" (the web server 114). Next, in step S705, the CPU 201 transmits the HTTP protocol data acquired from the web browser 106 to the access destination determined in step S704, using the second communication unit 110. In step S706, the CPU 201 performs conversion of the path in the HTML data when a response is received from the web server 113.

For example, consider the case in which the path "<img src="/image/001.gif">" is sent back from the web server 113 in the printer 102. In the present embodiment, the "src" mentioned above is converted so as to obtain "<img src="/PORT¯USB001/image/001.gif">".

The web browser 106 requests the information " "/PORT¯USB001/image/001.gif" " from the relay-dedicated proxy server 108 that has an HTML conversion function. Then, in step S707, the CPU 201 recognizes the HTTP protocol data, in which the HTML path was converted in step S706, as data to be transmitted to the web browser 106, and transmits the data from the first communication unit 109 to the web browser 106. Multiple printers can be connected by one relay-dedicated proxy server 108 due to the operation of the relay-dedicated proxy server 108 that has the HTML conversion function described above.

With the above-mentioned embodiment, peripheral devices can be accessed using a web browser via a local I/F. The implementation cost of a new application can be reduced since a general-purpose web browser can be used. Additionally, because a URL designation from a web browser allows access to a proxy server, access is possible from various types of browsers without upgrading a browser. Additionally, when accessing a peripheral device, security can be improved by going through a local I/F rather than through a network.

Additionally, in the above description, a proxy server was included on a PC including a web server, but a proxy server may be included on other devices, and access may be performed from a web browser via a network I/F or a local I/F. With this, one proxy server may be shared by multiple web browsers. When accessing via a network at this time, it is preferable that security between the web browser and proxy server is improved through an HTTPS or the like.

Note that in the above description, a printer was described as an example of a peripheral device, but there is no limitation to this, and various devices are applicable as long as they are accessible with a web browser according to a web server function. Additionally, in the description above, USB was described as an example of a local I/F, but the same processing can be done using another type of local I/F.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-126541, filed Jun. 1, 2012, which is hereby incorporated by reference herein in its entirety.

What is claimed is:

1. An information processing apparatus that can communicate with an external device via a local interface, comprising:
a memory storing instructions; and
at least one processor that, upon execution of the instructions stored in the memory, causes the information processing apparatus to:
receive an access instruction to access a web server of the external device connected via the local interface;
determine whether or not access request information issued by the access instruction includes port information used in a connection to the external device via the local interface;
in a case where the determination determines that the access request information does not include the port information, perform a search process for searching for the external device; and
start up a communication control unit by using port information, as a startup parameter, corresponding to the external device searched for by the search process,
wherein the communication control unit started up by the start-up communicates with the web server of the external device via the local interface.

2. The information processing apparatus according to claim 1, wherein the at least one processor causes the information processing apparatus to receive the access instruction via a device driver for causing the external device to execute a predetermined process.

3. The information processing apparatus according to claim 1, wherein, in a case where the determination determines that the access request information includes the port information, the start-up of the communication control unit uses the port information included in the access request information as the startup parameter.

4. The information processing apparatus according to claim 1, wherein the search searches for the external device via a network interface.

5. The information processing apparatus according to claim 1, wherein the communication control unit communicates with the web server of the external device via the local interface by performing network protocol communication over the local interface.

6. The information processing apparatus according to claim 1, wherein the at least one processor further causes the information processing apparatus to, in a case where a plurality of external apparatuses are searched for by the search process, generate page information for selecting one external apparatus from the plurality of external apparatuses, and
wherein, in a case where one external apparatus is selected by a select screen displayed based on the page information, the access request information including port information corresponding to the selected external apparatus is used.

7. The information processing apparatus according to claim 6, wherein the page information that is generated represents an HTML page, and the HTML page is transmitted to a web browser.

8. The information processing apparatus according to claim 1, wherein the local interface is USB.

9. A method that is executed in an information processing apparatus that can communicate with an external device via a local interface, comprising:
receiving an access instruction to access a web server of the external device connected to the information processing apparatus via the local interface;
determining whether or not access request information issued by the access instruction includes port information used in a connection to the external device via the local interface;
performing, in a case where the determining determines that the access request information does not include the port information, a search process for searching for the external device; and
starting up a communication controller by using port information, as a startup parameter, corresponding to the external device searched for by the search process,
wherein the communication controller started up by the starting communicates with the web server of the external device via the local interface.

10. The method according to claim 9, wherein the access instruction is received via a device driver for causing the external device to execute a predetermined process.

11. The method according to claim 9, wherein, in a case where the determining determines that the access request information includes the port information, the starting starts up the communication controller by using the port information included in the access request information as the startup parameter.

12. The method according to claim 9, wherein the search process searches for the external device via a network interface.

13. The method according to claim 9, wherein in a case of performing communication with the web server of the external device via the local interface, communication with the web server of the external device is performed via the local interface by performing network protocol communication over the local interface.

14. The method according to claim 9, further comprising generating, in a case where a plurality of external apparatuses are searched by the search process, page information for selecting one external apparatus from the plurality of external apparatuses, wherein, in a case where one external apparatus is selected by a select screen displayed based on the page information, the access request information including port information corresponding to the selected external apparatus is issued.

15. The method according to claim 9, wherein the local interface is USB.

16. A non-transitory computer-readable storage medium storing a program for causing a computer that can communicate with an external device via a local interface to:

receive an access instruction to access a web server of the external device connected via the local interface, determine whether or not access request information issued by the access instruction includes port information used in a connection to the external device via the local interface;

perform, in a case where it is determined that the access request information does not include the port information, a search process for searching for the external device; and start up a communication controller by using port information, as a startup parameter, corresponding to the external device searched for by the search process, wherein the started up communication control unit communicates with the web server of the external device via the local interface.

* * * * *